Figure 1:
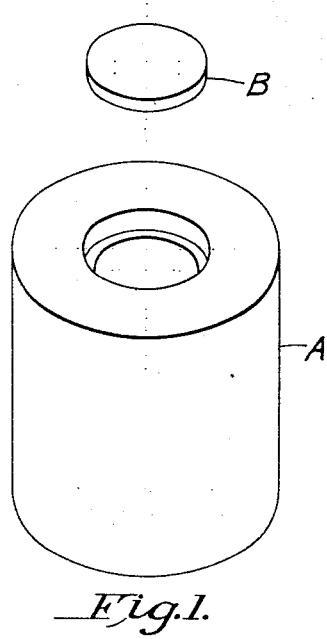

Feb. 21, 1933.   R. T. HURLEY   1,898,487
METHOD OF UNITING METAL PARTS AND ARTICLE PRODUCED THEREBY
Filed March 23, 1932

Inventor
Roy T. Hurley
By Attorney
Nathan, Bowman & Helferich

Patented Feb. 21, 1933

1,898,487

UNITED STATES PATENT OFFICE

ROY T. HURLEY, OF DOBBS FERRY, NEW YORK

METHOD OF UNITING METAL PARTS AND ARTICLE PRODUCED THEREBY

Application filed March 23, 1932. Serial No. 600,687.

This invention relates to the art of uniting metals and more specifically to that particular process generally known as "brazing".

The invention has as its primary object to overcome certain inherent weaknesses of brazed articles as heretofore made, and to that end it provides an improved method of brazing which produces a joint materially stronger than any brazed joint heretofore provided.

Brazing, as heretofore performed, consisted of assembling the parts to be united, placing adjacent their points of contact a small quantity of copper or brass, subjecting the assembly for a substantial period of time to a temperature sufficiently high to reduce the copper or brass to a molten state and to cause it to flow between the contacting surfaces of the parts, and then permitting the cooling of the assembly to cause the molten metal to freeze and thereby form a permanent bond between said parts. This type of joint is highly satisfactory for uniting those metals whose tensile strength is not greater than the tensile strength of the brazed joint. It has not, however, been entirely satisfactory for uniting certain other metals, such for example, as steel, whose tensile strength is materially greater than that of any bond, heretofore available, for uniting them by a brazing process.

Alloy steel of a kind often used has a tensile strength of approximately 150,000 pounds per square inch. A brazed joint, as heretofore made, has a tensile strength of approximately 32,000 pounds per square inch. Thus it will be seen that, as a chain is no stronger than its weakest link, so also is a brazed steel article, as heretofore made, no stronger than its brazed joint, which has been materially less than the strength of the parts.

I have discovered that a materially stronger brazed joint may be made by employing, as a bonding agent, an alloy of copper and beryllium. It has been found that by the addition of a small percentage of beryllium to copper, together with suitable heat treatment, the hardness and tensile strength of copper may be increased four fold or more. For example, pure copper has a tensile strength of approximately 32,000 pounds per square inch. An alloy of copper and 2.20% of beryllium has, after heat treatment as hereinafter to be described, a tensile strength of 154,000 pounds per square inch which, it will be observed, is greater than the tensile strength of the alloy steel above mentioned.

Thus it will be seen that a steel article made in accordance with this invention having the parts held together by a bond of heat treated copper-beryllium alloy will have its greatest strength in its joint.

My improved method of brazing metal conveniently may be carried out by assembling the parts in their desired relation, placing a quantity of copper-beryllium alloy adjacent the portions desired to be united, heating the parts and the alloy to a temperature, in the neighborhood of 1900° F., sufficient to melt the alloy and permit it to flow into the spaces between the parts and over their adjacent surfaces. Beryllium has a specific gravity of about 2.1% and an atomic weight of about 9.1. Next the parts, with the molten alloy therebetween, are subjected to a lower temperature to cause the alloy to freeze and form a permanent bond between the parts. The temperature of the composite articles is then reduced to approximately 575° F. or less.

One of the properties of copper-beryllium alloy is that after it has been heated and allowed to cool somewhat, subsequently maintaining it at a temperature materially below its melting point for a considerable period of time causes its tensile strength and degree of hardness to be greatly increased. Therefore, in accordance with this invention, as a step subsequent to brazing, I cause the composite articles to be maintained at a suitable temperature, which conveniently may be in the neighborhood of 575° F., for a considerable period of time which may be three hours, more or less. This may be done after brazing either by checking the temperature when it has been reduced to the desired point or by permitting the article to cool materially below that point and thereafter raising its temperature to the desired degree and holding it at that temperature for the desired period.

Preferably the initial heating or brazing operation will be effected in a reducing or non-oxidizing atmosphere. This conveniently may be done by performing the operation in a hydrogen or other suitable furnace.

This method of brazing has been found to be particularly useful in connection with so-called air hardening metals.

In brazing certain alloys, it may be advisable to use borax or other suitable flux in the brazing operation.

A drawing depicting the various steps which may be followed in putting this invention into practice and articles of manufacture made in accordance with this invention is annexed as a part of this disclosure and in such drawing:—

Figure 2:
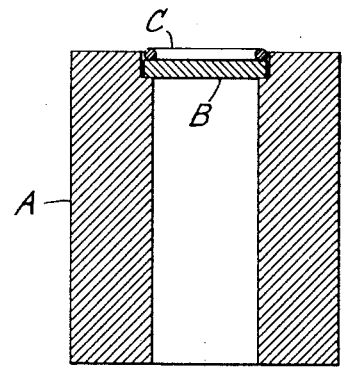
Figure 3:
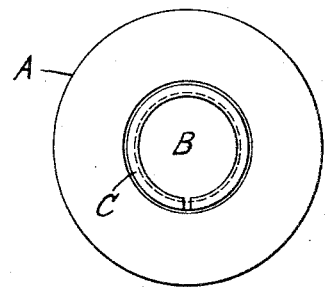
Figure 4:
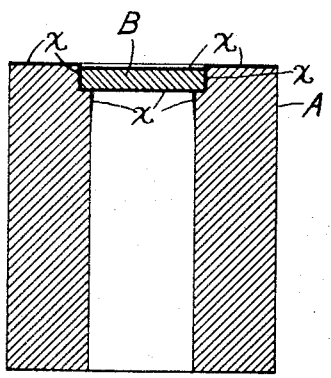
Figure 5:
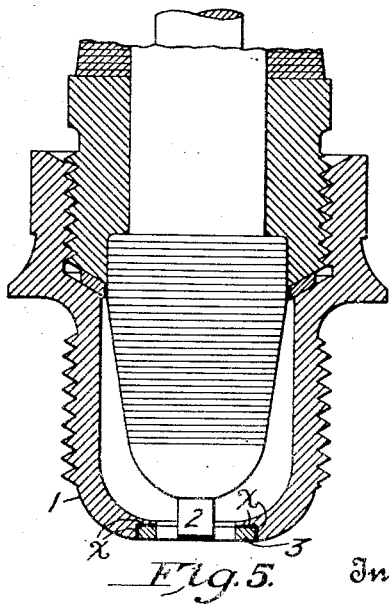

Figure 1 is a perspective view of two elements adapted to be brazed together to form a composite article of manufacture. Fig. 2 is a central vertical section showing the two elements assembled and a ring of copper-beryllium alloy placed thereon adjacent the place where the union is to be effected. Fig. 3 is a plan view showing the parts in the positions shown in Fig. 2. Fig. 4 is a central sectional view of a composite article of manufacture made of the elements shown in Fig. 1 by the present improved method and illustrating the flow of the copper-beryllium alloy between and over the surfaces of the united parts, the thickness of the alloy being exaggerated for convenience of disclosure. Fig. 5 is a central vertical section of a spark plug embodying the present invention.

This invention may be better understood by referring more specifically to the drawing which discloses only two of a great number of possible adaptations of this invention and first to Fig. 1 which shows two metal elements adapted to be united. The part A is shown as a steel sleeve open at each end and adapted to be closed at one end by having united therewith the steel of other high grade metal disk B. These elements are assembled in any suitable manner, such for example as shown in Fig. 2; and adjacent their portions to be united there is placed a quantity of copper-beryllium alloy indicated at C. Fig. 3 shows the parts as circular and the alloy arranged in the form of a ring located adjacent the periphery of the disk. It is to be understood, however, that the parts to be united may take various other forms or they may consist of portions of a single part such as opposite edges of a sheet metal plate.

After the parts have been suitably arranged and a quantity of the uniting alloy suitably placed, the assembly is subjected to a temperature sufficiently high to melt the alloy and cause it to flow between the melting faces of the parts and over portions of their surfaces as indicated by the heavy lines $x$ in Fig. 4. This step is preferably performed in a reducing or non-oxidizing atmosphere and conveniently may be done in a hydrogen furnace. Next the assembly is quenched or subjected to a temperature materially below the melting point of the alloy thereby causing the molten alloy then between the parts to freeze and form a permanent bond therebetween.

The next step in my improved method comprises subjecting the composite article to heat treatment for the purpose of hardening and materially increasing the tensile strength of the bond. This comprises subjecting the article to a temperature in the neighborhood of 575° F. for a period of three hours more or less. If desired this step also may be performed in a non-oxidizing atmosphere.

While I have described one specific way of placing the molten alloy between the surfaces to be united, it is to be understood that this invention is in nowise limited to that particular way and other suitable means or method may be employed for that purpose.

Fig. 5 illustrates a spark plug embodying another adaptation of the present invention. The base 1 of the spark plug may be made of mild steel and in accordance with the common practice constitutes one electrode, the other electrode 2 being insulated therefrom. To prevent corrosion and erosion it has been found desirable to construct the actual sparking portion of the base of a materially higher grade metal than would be practical for constructing the entire base element. To meet this demand I propose to braze into the lower or sparking end of the base, by my improved method, a ring 3 of high grade metal such, for example, as stainless steel, the uniting bond of copper-beryllium alloy being designated by the letter $x$.

From the foregoing it will be perceived that I have provided a new and decidedly useful method of uniting metal parts, specifically steel, by a brazed joint which, when treated in accordance with this invention, obtains a tensile strength as great or greater than the tensile strength of the parts united.

Likewise I have illustrated and described two articles of manufacture made in accordance with this invention.

Having thus revealed this invention I claim as new and desire to secure the following combinations and elements, or equivalents thereof, by Letters Patent of United States:—

1. A composite article of manufacture comprising a plurality of metal elements brazed together by copper-beryllium binary alloy.

2. An article of manufacture comprising a plurality of parts of metal brazed together by a joint consisting of copper-beryllium alloy containing less than 5% beryllium.

3. An article of manufacture comprising a plurality of sections of steel secured together by an intervening bond consisting of a copper-beryllium alloy having greater tensile strength than said sections.

4. An article of manufacture comprising a plurality of sections of steel united by a brazed joint of a binary copper-beryllium alloy.

5. The method of uniting metal parts which comprises assembling the parts to be united; placing adjacent the point of union a quantity of copper-beryllium alloy; heating said parts and said alloy to a temperature sufficient to melt said alloy; reducing the temperature of said parts and the molten alloy to a point of solidification; and maintaining said parts and alloy at a temperature approximately that of the transition point for the alloy for a substantial period of time.

6. The method of uniting metal parts which comprises assembling the parts to be united; placing adjacent their point of contact a quantity of copper-beryllium binary alloy; placing said parts in a furnace having a reducing atmosphere; raising the temperature of said parts and alloy to the melting point of the latter whereby the alloy will flow between said parts, removing said parts and alloy from said reducing atmosphere and cooling them to approximately 575° F., or less, thereby causing the alloy to form a bond between said parts; and subsequently subjecting said joined parts to a temperature of approximately 575° F. for a substantial period of time to strengthen said bond.

7. The method of uniting metal parts which comprises assembling the parts to be united; flowing between said parts molten copper-beryllium alloy; thereafter causing said molten alloy to freeze between said parts and form a joint therebetween; reducing the temperature of said alloy and the parts united thereby substantially below the freezing point of the alloy; and reheating said united parts to a point at approximately its transition point to strengthen said joint.

8. The method of uniting parts of metal which comprises assembling the parts to be united; heating said parts in a hydrogen atmosphere and flowing therebetween molten copper-beryllium alloy; removing said parts from said hydrogen atmosphere and reducing the temperature thereof, whereby said molten alloy freezes between parts and forms a bond therebetween; further reducing the temperature of the united parts to 575° F. or less; and subsequently subjecting said united parts to a temperature in the neighborhood of 575° F. for a substantial period of time.

9. The method of uniting parts of metal which comprises arranging the parts to be united; heating said parts in a hydrogen atmosphere; flowing between said parts molten copper-beryllium alloy; reducing the temperature of said parts and alloy sufficiently to cause said molten alloy to freeze between said parts and form a bond therebetween; and subsequently maintaining said united parts at a temperature of about 600° F. for a substantial period of time to strengthen said bond.

In witness whereof, I have hereunto subscribed my name.

ROY T. HURLEY.